Sept. 24, 1963     LA ROY E. ROBINSON     3,104,575
COMBINATION SAW GUIDE AND CHIP REMOVER
FOR BAND-TYPE SAWING MACHINES
Filed Nov. 21, 1960     2 Sheets-Sheet 1
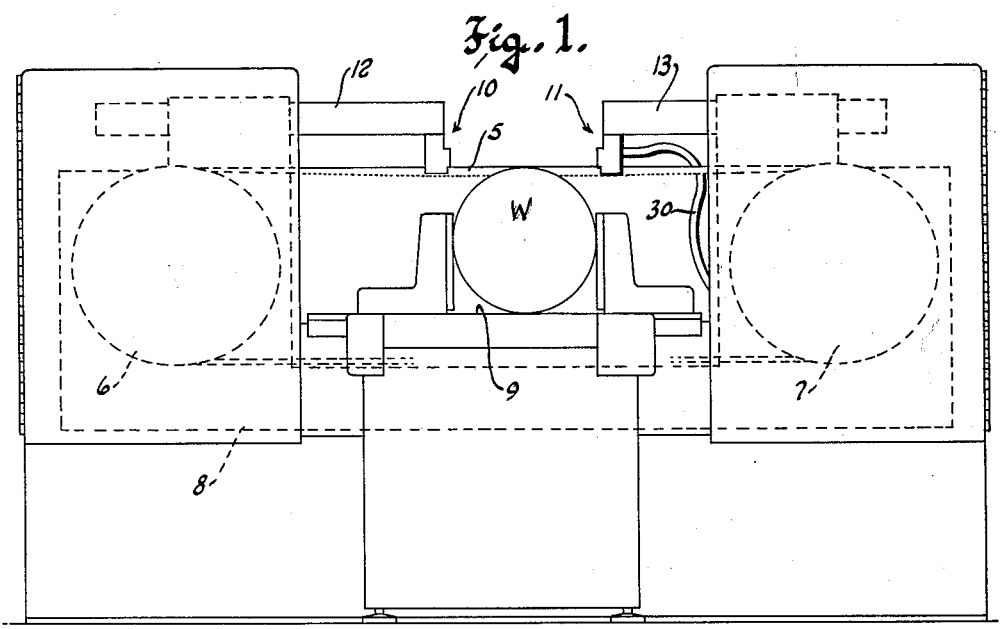
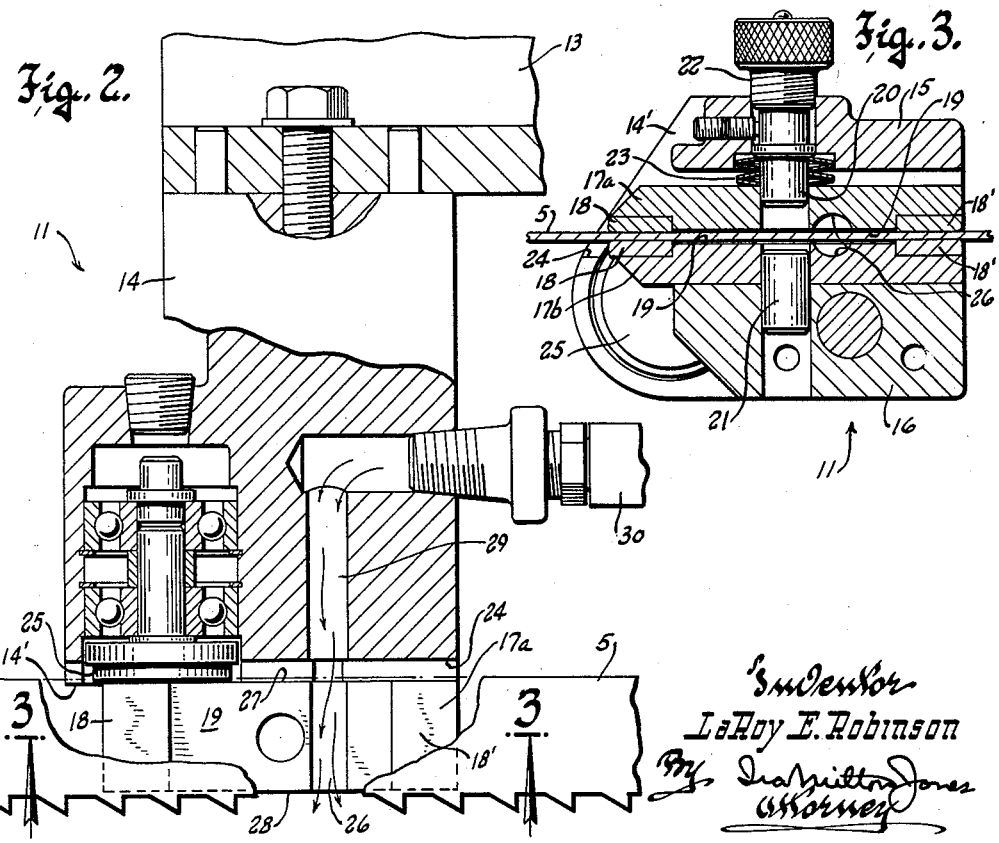
Inventor
LaRoy E. Robinson Sept. 24, 1963     LA ROY E. ROBINSON     3,104,575
COMBINATION SAW GUIDE AND CHIP REMOVER
FOR BAND-TYPE SAWING MACHINES
Filed Nov. 21, 1960     2 Sheets-Sheet 2
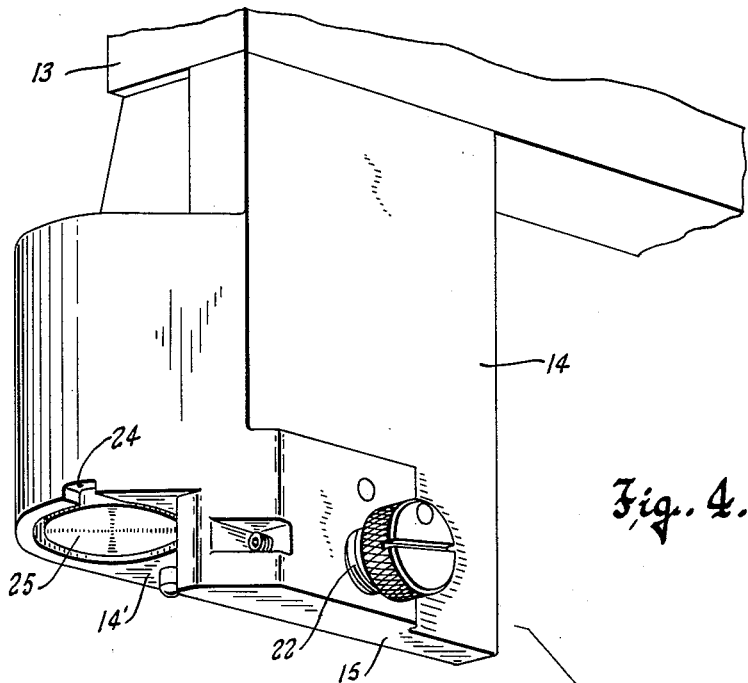
Fig. 4.
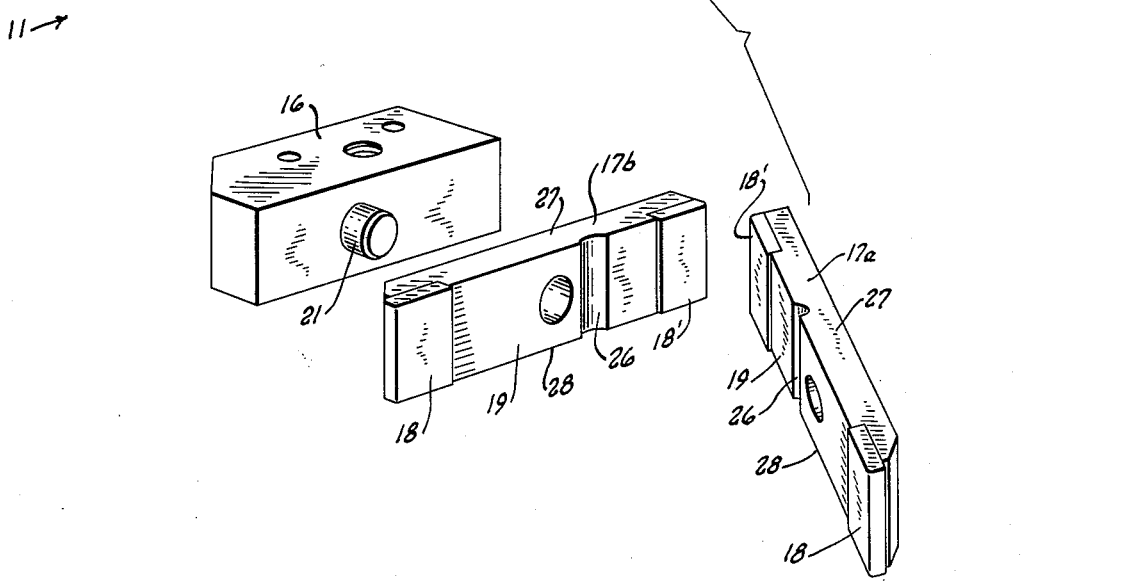
Inventor
LaRoy E. Robinson

United States Patent Office 3,104,575
Patented Sept. 24, 1963

3,104,575
COMBINATION SAW GUIDE AND CHIP REMOVER
FOR BAND-TYPE SAWING MACHINES
La Roy E. Robinson, Hopkins, Minn., assignor to Continental Machines, Inc., Savage, Minn., a corporation of Minnesota
Filed Nov. 21, 1960, Ser. No. 70,600
3 Claims. (Cl. 83—168)

This invention relates generally to sawing machines which employ an endless saw blade and has as its purpose to provide a guide for the saw blade which not only provides excellent guidance for the blade as it leaves the work being cut, but in addition has means to remove chips adhering to the saw blade as the blade passes through the guide. The invention thus is a combination saw guide and chip remover.

Although the saw blade guide and chip remover of this invention may be used to good advantage in any conventional band saw wherein the saw blade travels vertically down through the work zone of the machine, it is primarily intended for use with cutoff saws which employ an endless saw blade, such as that of Patent No. 2,898,669.

In cutoff saws of this type, the pulleys which carry the endless blade lie in a plane more vertical than horizontal (the axes of the wheels approaching horizontal). Hence, the cutting stretch of the blade must be twisted to dispose the same in a vertical plane as it passes through the cutting zone. To effect this result, the saw guides must grip the sides of the blade quite firmly. This requirement has been satisfactorily met by the saw guides which form the subject matter of the copending application of Jack Hendrickson, Serial No. 861,812, now Patent No. 2,992,-663. In the saw guides there disclosed, the saw blade is firmly held between a pair of cooperating guide shoes, yieldingly maintained in snug, sliding engagement with the blade.

The present invention uses the same guide shoe assembly but modified in a novel manner to enable the same to perform the additional function of effectively removing chips from the saw blade as it passes.

More specifically, it is an object of this invention to provide a combination saw guide and chip remover specifically designed to guide the saw blade as it leaves the work zone of the machine, which guide is equipped with means to project a stream of liquid, that also may be a coolant, across both sides of the blade from its back edge toward its toothed edge, as the blade passes through the guide, to thereby flush chips from the blade.

With the above and other objects in view which will appear as the description proceeds, this invention resides in the novel construction, combination and arrangement of parts substantially as hereinafter described and more particularly defined by the appended claims it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a front view of a cutoff saw of the type forming the subject matter of Patent No. 2,898,669, equipped with the combination saw guide and chip remover of this invention;

FIGURE 2 is a front view of the combination saw guide and chip remover of this invention, drawn to a much larger scale, and with parts broken away and in section;

FIGURE 3 is a bottom sectional view taken through FIGURE 2 on the plane of the line 3—3; and FIGURE 4 is an exploded perspective view of the component parts of the combination saw guide and chip remover.

Referring now particularly to the accompanying drawings, it will be seen that the invention has been illustrated in connection with a cutoff saw, wherein an endless saw blade 5 is trained about pulleys 6 and 7, carried by a movable saw head or frame 8. The head or frame 8 is mounted upon the base of the machine for translatory vertical motion to advance the cutting stretch of the saw blade, which in this machine is the top stretch, downward through the work W resting on a work support 9 on the base of the machine. The cutting stretch of the blade travels from left to right as viewed in FIGURE 1, and as it leaves the work W it carries with it a large quantity of chips which adhere rather tenaciously to the sides and toothed edge of the blade, but which must be removed before the blade reaches the pulley 7.

Since the saw blade must have its cutting stretch disposed in a vertical plane as it passes through the work zone, and since the axes of the pulleys 6 and 7 are more nearly horizontal than vertical, it is necessary that the cutting stretch of the blade be twisted as it enters and leaves the work zone. It is, of course, also essential that the cutting stretch of the blade be held as firmly as possible against deviation from its proper vertically disposed position.

The twisting and holding of the blade is the function of the two saw guides indicated generally by the numerals 10 and 11, the guide 10 being located at the entrance of the blade into the work zone, and the guide 11 being located at the "downstream" side of the work zone between it and the pulley 7.

The saw guides 10 and 11 are fixed to the outer ends of longitudinally aligned rails 12 and 13, respectively. These rails are firmly slidably mounted in the opposite end portions of the frame 8 for horizontal endwise movement parallel to the top stretch of the blade, to enable the saw guides to be disposed as close as practicable to the opposite sides of the work W being cut.

The upstream saw guide 10 may be exactly like that of the aforesaid Hendrickson Patent No. 2,992,663, but the saw guide 11 forms the subject matter of this invention, and is an improvement over its counterpart in that patent, in that it not only guides the saw blade as required, but, in addition, rids the blade of the adhering chips so that as the blade rides onto the pulley 7 it is free from objectionable accumulations of chips.

The improved saw guide 11 comprises a rigid supporting member or bracket 14, securely fixed to the underside of the rail 13 at the outer end thereof. At its lower end the bracket 14 has a flange 15 which projects down beyond the bottom or underside 14' of the bracket and, together with a block 16, solidly secured to the underside of the bracket, gives the lower portion of the supporting member or bracket a bifurcated shape, the flange 15 being one of its furcations and the block 16 the other. These furcations straddle the saw blade and have a pair of guide shoes 17a and 17b mounted therebetween.

The guide shoes are identical and are substantially elongated rectangular metal blocks with hardened steel or carbide inserts 18—18' in their opposite end portions. These inserts provide wear plates and have coplanar surfaces raised slightly above the opposing inner faces 19 of the guide shoes. Hence, the hardened inserts or wear plates are the only portions of the guide shoes which engage the saw band or blade, and since the shoes are identical, it follows that the inserts of one shoe are opposite those of the other and that the blade travels first between one pair or set of the opposed inserts and then between the other pair or set thereof.

The guide shoes 17a—17b are removably mounted at the underside of the supporting member or bracket 14 in the space between its flanges or furcations 15 and 16 with their upper edges bearing against the underside 14' of the bracket. The shoes are held in position by pins 20 and 21 which project respectively from the inner faces of the furcations 15 and 16 and have a relatively close fit in appropriately located holes in the shoes. The pin 20 which mounts the shoe 17a, preferably is a smooth reduced diameter end portion of a screw 22 threaded in the flange 15, and by which the tension of a stack of spring washers 23 interposed between a shoulder on the screw and the adjacent face of the shoe 17a, may be adjusted. The spring washers, of course, yieldingly urge the shoe 17a towards the other shoe 17b which may be considered stationary since it is at all times solidly supported by the block or furcation 16. In this way, the saw blade is constrained to travel along a path fixed by the location of the stationary shoe 17b.

The fixed location of the guide shoe 17b is such that the back edge of the saw blade will be symmetrically disposed with respect to a groove 24 in the underside 14' of the supporting member. This groove provides clearance between the back edge of the saw blade and the supporting member and enables all of the reaction to the sawing force to be carried by a backup roller 25 journalled in the supporting member, as more fully described in the Hendrickson patent.

Between its wear plates 18—18', each guide shoe has a groove or slot 26 in its inner face 19 which extends transversely thereacross from its upper edge 27 which is adjacent to the back edge of the saw blade to its lower edge 28, which is close to the toothed edge of the blade. Together these grooves or slots 26 form a duct which is bisected by the saw blade and has an inlet end at the top of the guide shoes contiguous to the underside 14' of the supporting member or bracket, and an outlet end at the bottom thereof just above the toothed edge of the blade. Liquid coolant delivered to the inlet end of the duct under pressure thus flushes chips from the blade, and from between the guide shoes as the blade travels between the shoes.

Coolant liquid is delivered to the duct formed jointly by the grooves or slots 26, through a drilled passage 29 in the supporting member or bracket 14, the mouth of which opens to the grooved underside 14' of the bracket in line with the inlet end of the duct. The liquid may be fed to the passage in any suitable way, as through a hose line 30 which connects the passage 29 with a source of coolant liquid under pressure, not shown.

From the foregoing description, taken in connection with the accompanying drawings, it will be readily apparent to those skilled in this art, that this invention attains an objective long sought by manufacturers of endless band or blade-type sawing machines, namely, efficient removal of chips from the saw blade as the blade leaves the work zone of the machine, and that it does so by only a simple change in the structure of the downstream saw guide; and further, that by adding the chip removing function to the saw guide, the guidance given thereby to the blade is improved.

What is claimed as my invention is:

1. In a band-type sawing machine having an endless saw blade trained about spaced pulleys with one stretch thereof travelling linearly in one direction through the work zone of the machine which is located between the pulleys, and upon leaving work being cut has a large quantity of chips adhering thereto, a combination saw guide and chip remover for said stretch of the saw blade comprising: a rigid supporting member; means mounting the supporting member between the downstream side of the work zone of the machine and the adjacent pulley with a surface of the supporting member contiguous to the back edge of said stretch of the saw blade; a pair of guide shoes carried by the supporting member, one at each side of the saw blade, with an edge of each shoe in juxtaposition to said surface of the supporting member, said guide shoes having opposing faces between which the saw blade slides with the back edge of the blade adjacent to said edge of the shoes and the toothed edge adjacent to the opposite edge of the shoes; means yieldingly urging one of the guide shoes toward the other so that the shoes grip the sides of the saw blade travelling therebetween; the supporting member having means defining an inlet passage for coolant liquid, the mouth of which opens to said surface of the supporting member in line with the back edge of the saw blade and extending to opposite sides thereof; and means on the guide shoes together forming a duct which is bisected by the saw blade and extends from one to the other of said edges of the shoes and hence is transverse to the saw blade, the inlet end of the duct being contiguous to the mouth of the inlet passage to receive coolant liquid therefrom and the discharge end of the duct being adjacent to the toothed edge of the saw blade so that coolant liquid delivered under pressure to said duct by said inlet passage flushes chips from the advancing saw blade as the blade passes between the guide shoes.

2. A combination guide and chip remover for endwise moving saw blades comprising: a pair of identical guide shoes having substantially rectangular opposing faces between which the saw blade travels; spaced apart hardened inserts in the end portions of each shoe, said inserts having flat coplanar surfaces upon which the saw blade rides as it travels between the shoes; and the shoes having aligned grooves extending transversely across their opposing faces between their respective hardened inserts, said grooves together defining a duct which is bisected by a saw blade travelling between the shoes so that pressurized liquid delivered to the end of the duct nearest the back edge of the saw blade and discharged from the other end of the duct flushes chips from the sides and toothed edge of the blade as it passes from between one set of hardened inserts to the other.

3. In a band-type cutoff saw having an endless saw blade trained about horizontally spaced pulleys with one stretch thereof travelling linearly in one substantially horizontal direction, through the work zone of the machine with the toothed edge of the blade facing downwardly to cut through a piece of work in the work zone, as the blade moves downward, the blade carrying a large quantity of chips with it as it leaves the work, a combination saw guide and chip remover to guide the cutting stretch of the saw blade as it leaves the work zone and to remove chips adhering to the blade, comprising: a rigid supporting member having a bifurcated lower end; means securely mounting the supporting member between the downstream side of the work zone and the adjacent pulley with its bifurcated lower end straddling the cutting stretch of the saw blade; a pair of guide shoes embraced by the bifurcated lower end of the supporting member, one at each side of the saw blade; means detachably connecting the guide shoes with the adjacent furcations of the supporting member, one of said shoes bearing against its respective furcation and hence being a stationary shoe, and the other guide shoe having limited movement towards and from the stationary shoe; means reacting between the movable guide shoe and its respective furcation to yieldingly urge the same towards the stationary shoe and thereby cause the saw blade to be firmly gripped between the shoes, with the toothed edge of the blade exposed directly below the guide shoes; the guide shoes having opposing inner faces between which the saw blade travels, said inner faces having slots extending thereacross from top to bottom, the slots of the two shoes being directly opposite one another to jointly form a duct extending through the guide shoes and through which the blade passes with its toothed edge just below the lower end of the duct; and the supporting member having a liquid coolant passage formed therein with its discharge mouth opening downward into the space between its furcations and in line with the upper inlet end of said duct to supply liquid coolant to the duct.

References Cited in the file of this patent

UNITED STATES PATENTS

| | | |
|---|---|---|
| 195,626 | McDonough | Sept. 25, 1877 |
| 1,496,035 | Thompson | June 3, 1924 |
| 2,107,174 | Boice | Feb. 1, 1938 |
| 2,815,562 | Wilkie et al. | Dec. 10, 1957 |
| 2,868,248 | Pedersen | Jan. 13, 1959 |
| 2,992,663 | Hendrickson | July 18, 1961 |